US009591378B2

(12) United States Patent
White et al.

(10) Patent No.: US 9,591,378 B2
(45) Date of Patent: *Mar. 7, 2017

(54) SYSTEM FOR MANAGING A CONFIGURATION OF A MEDIA CONTENT PROCESSOR

(71) Applicant: AT&T INTELLECTUAL PROPERTY I, LP, Atlanta, GA (US)

(72) Inventors: Scott White, Austin, TX (US); James Cansler, Pflugerville, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/926,662

(22) Filed: Oct. 29, 2015

(65) Prior Publication Data
US 2016/0050464 A1 Feb. 18, 2016

Related U.S. Application Data

(63) Continuation of application No. 11/838,711, filed on Aug. 14, 2007, now Pat. No. 9,204,204.

(51) Int. Cl.
H04N 7/16 (2011.01)
H04N 21/658 (2011.01)
(Continued)

(52) U.S. Cl.
CPC ..... H04N 21/6582 (2013.01); H04N 21/4432 (2013.01); H04N 21/6175 (2013.01)

(58) Field of Classification Search
CPC .. H04N 21/466; H04N 21/266; H04N 21/432; H04N 21/482; H04N 21/436; H04N 21/4858; H04N 21/2343; H04N 21/4788; H04N 21/258; H04N 21/8547; H04N 21/475; H04N 21/431; H04N 21/8173; H04N 21/6112; H04N 21/4622; H04N 21/4756
(Continued)

(56) References Cited

U.S. PATENT DOCUMENTS 5,644,766 A 7/1997 Coy et al.
6,393,585 B1 5/2002 Houha
(Continued)

FOREIGN PATENT DOCUMENTS

KR 20010003948 1/2001
WO 00/40005 7/2000

OTHER PUBLICATIONS

Petrie, "A Framework for SIP User Agent Configuration", Nov. 2001.*

Primary Examiner — Nasser Goodarzi
Assistant Examiner — An Nguyen
(74) Attorney, Agent, or Firm — Guntin & Gust, PLC; Matthew Tropper

(57) ABSTRACT

A system that incorporates teachings of the present disclosure may include, for example, a media content processor having a controller adapted to transmit to a web server one or more configurations of said media content processor. The web server can record said one or more configurations to perform one among re-provisioning of the media content processor after it experiences a loss of configuration information and provisioning of another media content processor. Other embodiments are disclosed.

20 Claims, 4 Drawing Sheets

(51) Int. Cl.
*H04N 21/443* (2011.01)
*H04N 21/61* (2011.01)

(58) Field of Classification Search
USPC .... 725/14, 28, 80, 42, 46, 62, 109, 143, 92, 725/75, 116, 142, 25, 86, 93, 134
See application file for complete search history.

(56) References Cited

U.S. PATENT DOCUMENTS

| | | | | |
|---|---|---|---|---|
| 7,539,631 | B1* | 5/2009 | El-Haj | G06Q 30/06 705/26.1 |
| 2002/0087668 | A1* | 7/2002 | San Martin | G06F 8/65 709/221 |
| 2003/0005446 | A1 | 1/2003 | Jaff | |
| 2003/0018971 | A1* | 1/2003 | McKenna, Jr. | H04N 21/462 725/40 |
| 2003/0223504 | A1* | 12/2003 | Chen | H03H 17/0294 375/260 |
| 2003/0229900 | A1* | 12/2003 | Reisman | G06F 17/30873 725/87 |
| 2004/0030995 | A1 | 2/2004 | Bhogal et al. | |
| 2004/0123332 | A1 | 6/2004 | Hanson | |
| 2005/0031108 | A1* | 2/2005 | Eshun | H04L 29/06 379/201.12 |
| 2005/0131996 | A1* | 6/2005 | Mastrianni | H04L 67/1095 709/203 |
| 2005/0160308 | A1* | 7/2005 | Elcock | G11B 27/36 714/5.1 |
| 2005/0216933 | A1* | 9/2005 | Black | H04N 7/163 725/34 |
| 2007/0074258 | A1* | 3/2007 | Wood | H04N 7/17318 725/105 |
| 2007/0121584 | A1* | 5/2007 | Qiu | H04M 3/42042 370/352 |
| 2008/0092171 | A1* | 4/2008 | Roberts | G06F 3/0482 725/46 |
| 2008/0235299 | A1* | 9/2008 | Haselton | G06F 11/1451 |

\* cited by examiner

100

200

SYSTEM FOR MANAGING A CONFIGURATION OF A MEDIA CONTENT PROCESSOR

CROSS REFERENCE TO RELATED APPLICATION

This application is a continuation of U.S. patent application Ser. No. 11/838,711, filed Aug. 14, 2007, now U.S. Patent Publication No. 2009-0049506, which is incorporated herein by reference in its entirety.

FIELD OF THE DISCLOSURE

The present disclosure relates generally to system maintenance techniques and more specifically to a system for managing a configuration of a media content processor.

BACKGROUND

Media content processors such as a Set-Top Box (STB) receiver and/or a Digital Video Recorder (DVR) have over the course of time evolved to complex devices capable of a wide variety of configurable features that include for example parental controls, comprehensive scheduling of media content recordings, customization of electronic programming guides, storage of home videos and pictures, and so on. These configurations which are usually developed incrementally over several years can be lost when the STB receiver or DVR is damaged or malfunctions.

DETAILED DESCRIPTION

In one embodiment of the present disclosure, a computer-readable storage medium operating in a web server can have computer instructions for establishing communications with a Set-Top Box (STB) receiver over an Internet Service Provider (ISP) network, retrieving one or more configurations of the STB receiver, recording the one or more configurations, receiving from a requesting STB receiver over the ISP network a request for the one or more configurations, and transmitting to the requesting STB receiver over the ISP network the one or more configurations to provision operations of said requesting STB receiver.

In one embodiment of the present disclosure, a media content processor can have a controller adapted to transmit to a web server one or more configurations of said media content processor. The web server can record said one or more configurations to perform one among re-provisioning of the media content processor after it experiences a loss of configuration information and provisioning of another media content processor.

In one embodiment of the present disclosure, a Digital Video Recorder (DVR) can have a controller adapted to record media content supplied by a media communication system, and transmit to a web server one or more configurations of said DVR. The web server can record said one or more configurations to perform one among re-provisioning of the DVR after it experiences a loss of configuration information and provisioning of another DVR.

Figure 1:
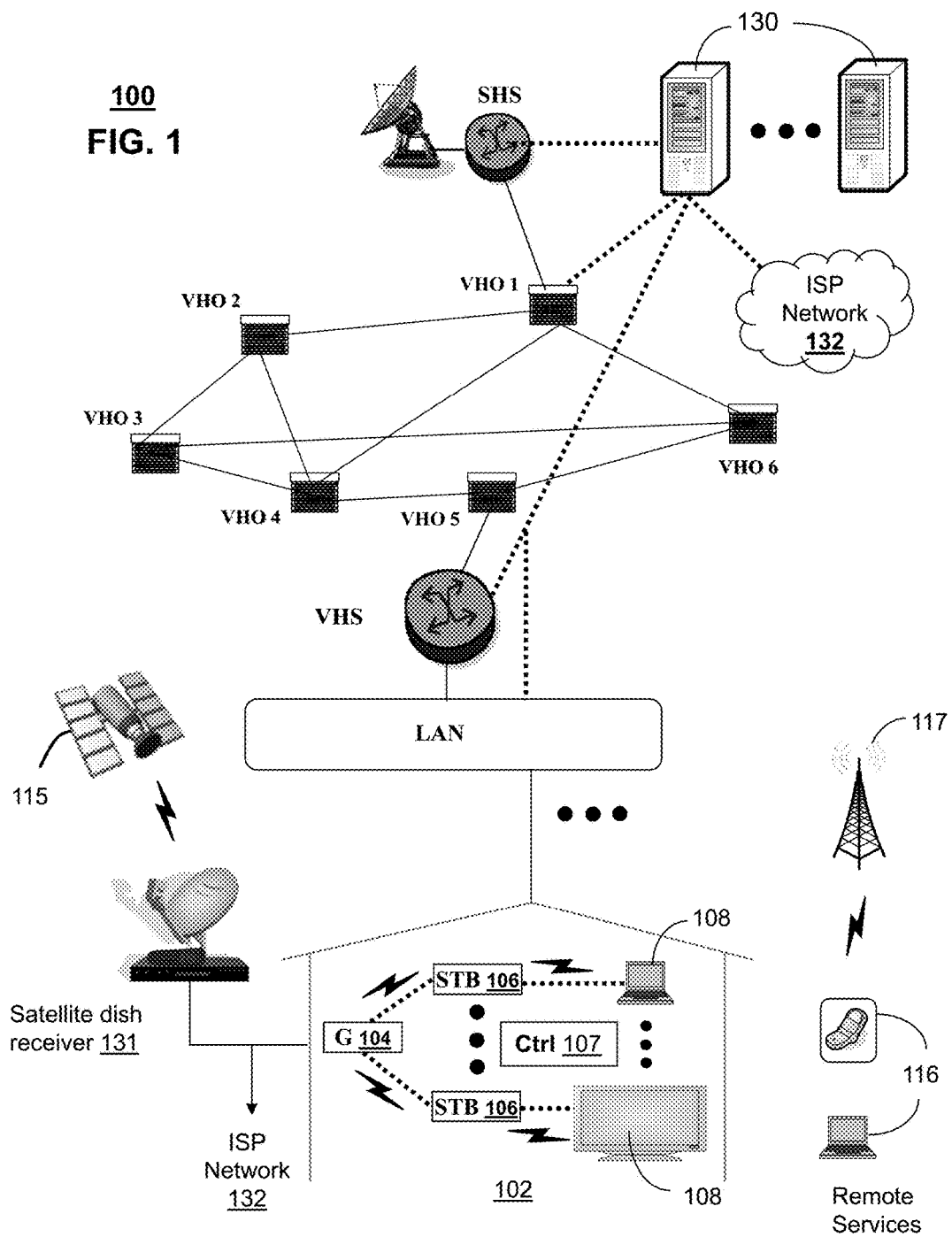
FIG. 1 depicts an exemplary embodiment of a communication system.

FIG. 1 depicts an exemplary embodiment of a communication system 100. The communication system 100 can represent an IPTV broadcast media system. In a typical IPTV infrastructure, there is at least one super head office server (SHS) which receives national media programs from satellite and/or media servers from service providers of multimedia broadcast channels. In the present context, media programs can represent audio only content, video only content, and/or combinations thereof. The SHS server forwards IP packets associated with the media content to video head servers (VHS) via a network of video head offices (VHO) according to a common multicast communication method.

The VHS then distributes multimedia broadcast programs to commercial and/or residential buildings 102 housing a gateway 104 (e.g., a residential gateway or RG). The gateway 104 distributes broadcast signals to media content processors 106 such as Set-Top Boxes (STBs) which in turn present broadcast selections to media devices 108 such as computers or television units managed in some instances by a media controller 107 (e.g., an infrared or RF remote control). Unicast traffic can also be exchanged between the media content processors 106 and subsystems of the IPTV media system for services such as video-on-demand (VoD).

The IPTV media system can be coupled to one or more computing devices 130 that can operate as a web or Internet server for providing portal services over an Internet Service Provider (ISP) network 132 to fixed media devices 108 or portable communication devices 116 by way of a wireless base station 117 such as in a cellular communication network operating with common protocols (GSM, CDMA, etc.).

A satellite broadcast system can be used in place of the IPTV media system. In this embodiment, signals transmitted by a satellite 115 can be intercepted by a satellite dish receiver 131 coupled to building 102 which conveys media signals to the media content processors 106 by way of gateway 104. The media content processors 106 can be equipped with a broadband port to the ISP network 132.

Although not shown, the communication system 100 can also be combined or replaced with analog or digital broadcast distributions systems such as cable systems. It would be apparent therefore to one of ordinary skill in the art that the present disclosure can be applied to any content media system.

Figure 2:
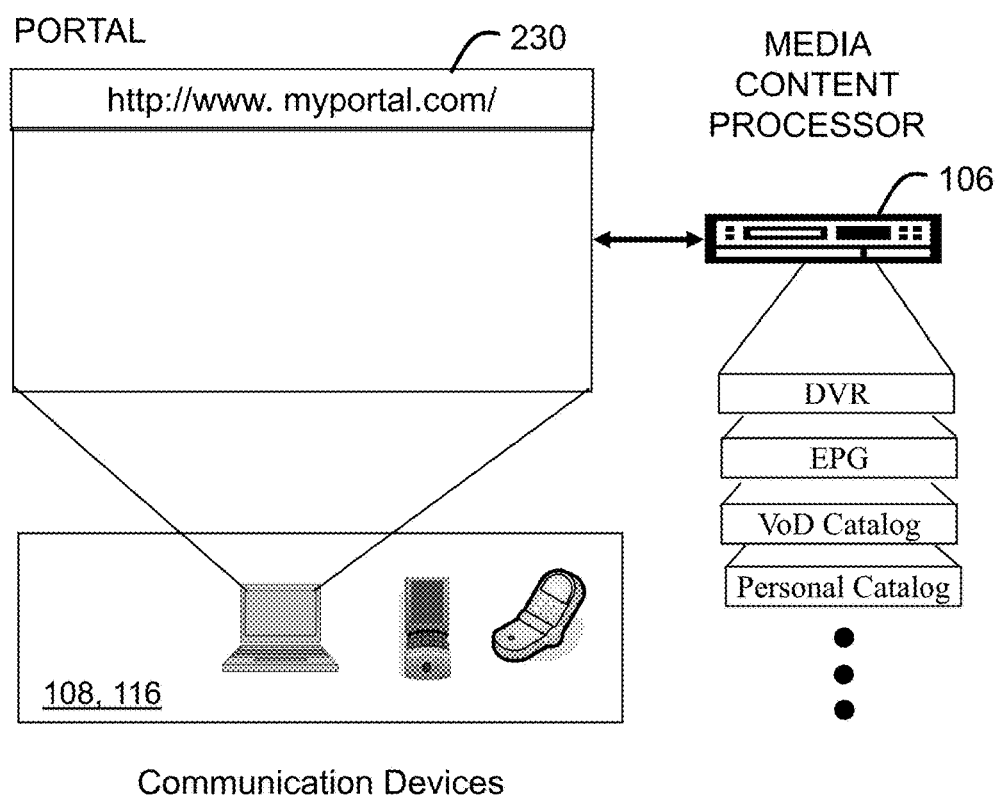
FIG. 2 depicts an exemplary embodiment of a portal of the communication system.

FIG. 2 depicts an exemplary embodiment of a portal 230 of the communication system 100. In FIG. 2, the portal 230 can be accessed by a URL with a common browser such as Microsoft's Internet Explorer using an Internet-capable fixed or portable communication device 108, 116. The portal 230 can be configured to access a media content processor 106 such as the STB of FIG. 1 and services managed thereby such as a Digital Video Recorder (DVR), an Electronic Programming Guide (EPG), Video on Demand (VoD) catalog, a personal catalog stored in the STB (e.g., personal videos, pictures, audio recordings, etc.), and so on by way of the gateway 104.

Figure 3:
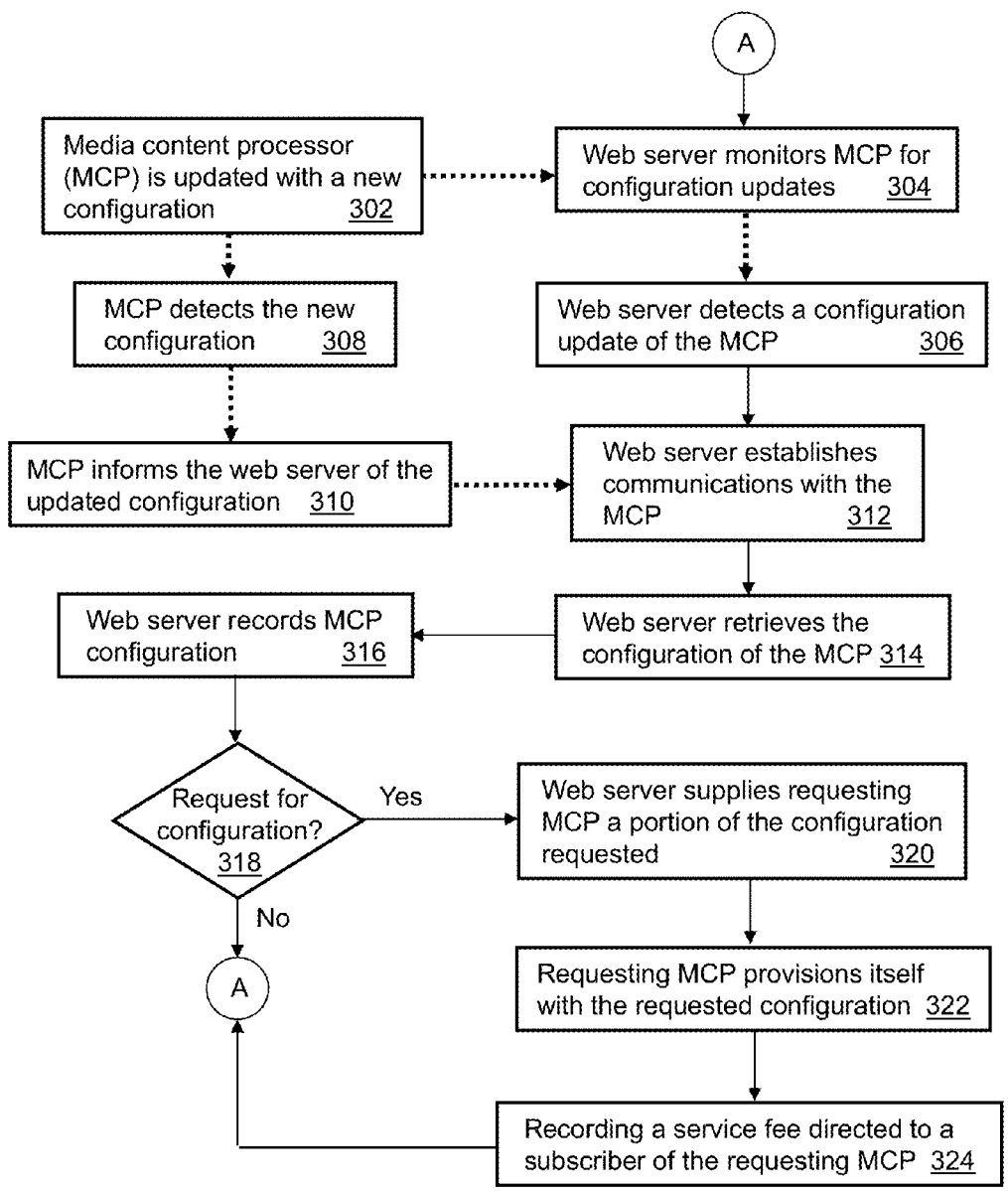
FIG. 3 depicts an exemplary method operating in portions of the communication system.

FIG. 3 depicts an exemplary method 300 operating in portions of the communication system 100. Method 300 begins with step 302 in which a media content processor (MCP) 106 such as an STB or DVR is updated with a new configuration. The new configuration can be an incremental change to previous configurations or a first installation of the device at a subscriber's premises 102. In the present context a configuration can include but is not limited to one or more configurations for recording media content (e.g., DVR setting to record a baseball game, recurring TV shows, etc.), one or more configurations for managing personal media content (e.g., personal home videos and pictures), one or more configurations of one or more electronic programming guides customized by the subscriber of the MCP 106, one or more configurations for establishing parental controls over media content presented by the MCP, and one or more configurations associated with end user or subscriber preferences that manage operations of the STB receiver (e.g., wall paper settings, screen saver settings, VoD preferences by genre, actor, etc.).

In one embodiment, the web server 130 can be programmed to monitor in step 304 the MCP 106 for configuration updates. This can be accomplished by establishing communications with the MCP 106 over the ISP network 132 by way of the gateway 104, and periodically (e.g., once or twice per day) monitoring for incremental configuration changes in the MCP. Incremental changes can be detected by comparing a recorded copy of a configuration of the MCP 106 to the configurations monitored. When a configuration change is detected in step 306, the web server 130 reestablishes communications with the MCP 106 in step 312 and retrieves the updated configuration in step 314. The web server 130 can then record the MCP 106 configuration in a local or remote database for later use in recovery and MCP updates. Alternatively, or in combination, the MCP 106 can be programmed in step 308 to detect by changes to its configuration. A change can be detected when for example the subscriber makes changes to a configuration with the media controller 107. When a configuration update is detected, the MCP 106 informs the web server 130 in step 310 of the update. The web server 130 in response performs steps 312 through 316 as previously described.

In step 318, the web server 130 can be programmed to monitor a request for a copy of a portion or all of the recorded configuration for a select MCP 106. When no requests are detected, the web server 130 repeats method 300 from step 304 as previously described. When a requesting MCP 106 submits a request for all or a portion of recorded configurations, it can identify itself to the web server 130 by common means such as for example a static IP address, a Media Access Control (MAC) address, a model number, a serial number, and/or a subscriber identification number derived from a service account between the subscriber and the service provider of the web server 130. Once identified, the web server 130 can associate the identification supplied by the requesting MCP 106 with a storage location in its database of the portion of configuration information requested.

It should be noted that a requesting MCP 106 can represent the MCP 106 from which the configuration was retrieved in step 314. In this instance, the requesting MCP 106 can be requesting a portion of the configuration recorded to for example restore configuration information that was detected as lost by the requesting MCP or a subscriber of said device. The requesting MCP 106 can also make such requests even when a loss is not detected as a fail safe measure that the configuration information has not been corrupted. Alternatively, the requesting MCP 106 can represent an MCP that is replacing an MCP that is damaged, or being upgraded or downgraded to reflect a change in subscriber services.

When a request for configuration information is detected in step 318, the web server 130 proceeds to step 320 where it supplies the requesting MCP a portion of the configuration information requested. In step 322, the requesting MCP 106 provisions itself with the requested configuration. This provisioning step can represent a full or partial re-provisioning of the MCP 106 which can include a restoration of parental controls, DVR programming, personal media content settings, and so on. In some instances, the configuration information can also include a restoration of the operating system of the MCP 106 along with settings established by the subscriber, personal media content of the subscriber such as home videos and pictures and so forth. Accordingly, the configuration supplied by the web server 130 can be as thorough as required to satisfy the needs of the subscriber.

It should be noted that the web server 130 can also be programmed to transcode the configurations requested when an incompatibility exists between the MCP 106 from which the configurations were retrieved in step 314 and a new MCP that differs in its features, operating system, file system format, or the like. Such incompatibility can be detected from the identification supplied by the requesting MCP 106. The identification can be used by the web server 130 to identify a model type of each of the MCPs 106 and to determine operating and configurable differences thereof. The web server 130 can then resort to common transcoding techniques to transfer the configuration from one MCP model to another with differences resolved by the transcoding of said configurations. These activities can be performed transparently so that it does not burden the subscriber.

Once the new or old MCP 106 has been restored with the configurations, the service provider can program the web server 130 to record a service fee for the restoration service provided thereby. The service fee can be submitted to a billing system which records the fee in the subscribers overall service fee for the IPTV, satellite or cable TV media system. From this point, the web server 130 returns to step 304 and repeats method 300 as previously described.

Upon reviewing the aforementioned embodiments, it would be evident to an artisan with ordinary skill in the art that said embodiments can be modified, reduced, or enhanced without departing from the scope and spirit of the claims described below. For example, the MCP 106 can be a combination of an STB receiver and a DVR, each collectively performing the steps of method 300. Moreover the extent of configurations monitored and recorded by the web server 130 can be expanded or reduced as desired by the service provider. Additionally, configuration updates can be accepted by the web server 130 in an incremental format or full uploads. The MCP 106 can also be programmed to proactively submit to the web server 130 incremental configuration updates without waiting for the web server to retrieve this information in step 314.

These are but a few examples of modifications that can be applied to the present disclosure without departing from the scope of the claims. Accordingly, the reader is directed to the claims section for a fuller understanding of the breadth and scope of the present disclosure.

Figure 4:
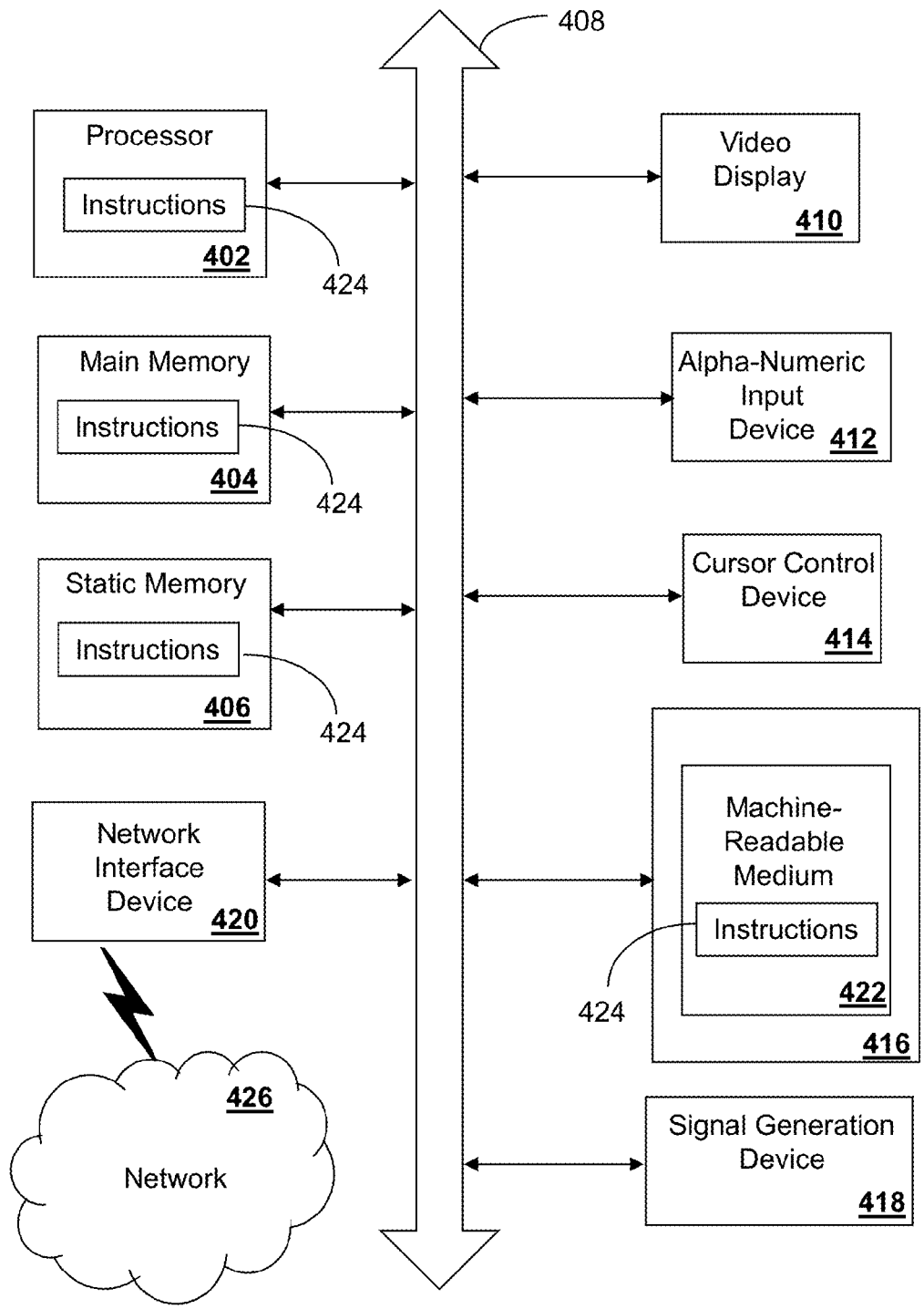
FIG. 4 is a diagrammatic representation of a machine in the form of a computer system within which a set of instructions, when executed, may cause the machine to perform any one or more of the methodologies discussed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory, machine-readable storage medium, comprising executable instructions that, when executed by a processing system including a processor, facilitate performance of operations, comprising:
   communicating with a media processor over a network;
   monitoring to detect changes to an initial configuration applied to the media processor to adapt operations of the media processor, and wherein the changes comprise an updated configuration;
   retrieving the updated configuration from the media processor responsive to the detecting of the changes;
   recording the updated configuration in a storage device communicatively coupled to the network to provide a stored configuration;
   receiving a request for the stored configuration, wherein the request is generated by the media processor or a device that differs from the media processor;
   determining an incompatibility of the updated configuration for use by the media processor or the device that differs from the media processor;
   responsive to determining the incompatibility, adjusting the updated configuration to generate an adjusted configuration; and
   transmitting the adjusted configuration to provision operations of the media processor or the device that differs from the media processor.

2. The non-transitory, machine-readable storage medium of claim 1, wherein the request is from the media processor or the device from which the updated configuration was retrieved, and wherein the stored configuration is used by the media processor or the device to restore provisioning of the media processor or the device.

3. The non-transitory, machine-readable storage medium of claim 1, wherein the request from the media processor or the device is for a new media processor or a new device that replaces the media processor or the device from which the updated configuration was retrieved, and wherein the stored configuration is used to provision the new media processor or the new device.

4. The non-transitory, machine-readable storage medium of claim 1, wherein the updated configuration further comprises one of a configuration of a customized electronic programming guide, a configuration for parental controls over media content presented by the media processor or the device, a configuration associated with end user preferences that manage operations of the media processor or the device, or any combination thereof,
   wherein the operations further comprise:
      receiving identification information from the media processor including a static internet protocol address and a media access control address;
      utilizing the identification information to retrieve the updated configuration; and
      adjusting the stored configuration according to the identification information of the media processor or the device.

5. The non-transitory, machine-readable storage medium of claim 1, wherein the monitoring for changes comprises periodically polling the set-top box.

6. The non-transitory, machine-readable storage medium of claim 1, wherein the operations further comprise receiving a notice from the media processor that the changes to the initial configuration have been made to the media processor.

7. The non-transitory, machine-readable storage medium of claim 1, wherein the operations further comprise recording a service fee directed to a subscriber of the media processor or the device for supplying the stored configuration.

8. The non-transitory, machine-readable storage medium of claim 1, wherein the operations further comprise:
   retrieving media content from the media processor; and
   recording the media content responsive to recording instructions in the updated configuration.

9. The non-transitory, machine-readable storage medium of claim 1, wherein the operations further comprise:
   retrieving an operating system and settings of the media processor; and
   recording the operating system and settings as part of the stored configuration.

10. A method, comprising:
    communicating, by a processing system comprising a processor, with a first media processor over a network;
    monitoring, by the processing system, changes to an initial configuration applied to the first media processor to adapt operations of the first media processor, and wherein the changes comprise an updated configuration;
    retrieving, by the processing system, the updated configuration from the first media processor responsive to the monitoring detecting the changes;
    recording, by the processing system, the updated configuration in a storage device communicatively coupled to the network to provide a stored configuration;
    receiving, by the processing system, a request for the stored configuration, wherein the request is generated by a second media processor that differs from the first media processor;
    determining, by the processing system, an incompatibility of the updated configuration for use by the second media processor;
    responsive, by the processing system, to determining the incompatibility, adjusting the updated configuration to generate an adjusted configuration; and
    transmitting, by the processing system, the adjusted configuration to provision operations of the second media processor.

11. The method of claim 10, wherein the first media processor corresponds to a set-top box receiver, and wherein the first media processor operates in an internet protocol television communication system.

12. The method of claim 10, wherein the transmitting of the updated configuration is performed over an interactive television network.

13. The method of claim 10, further comprising:
   detecting a loss of configuration information;
   transmitting to a web server a request for a portion of the stored configuration;
   obtaining from the web server the portion of the stored configuration; and
   provisioning the first media processor according to the portion of the stored configuration.

14. The method of claim 10, wherein the changes to the initial configuration further comprises changes to configurations for recording media content, changes to configurations for managing personal media content, changes to configurations of a customized electronic programming guide, or any combination thereof.

15. The method of claim 10, wherein the transmitting of the updated configuration is over one of an internet protocol television network, a cable television network, or a satellite television network.

16. The method of claim 10, wherein the updated configuration comprises an operating system of the first media processor.

17. A device, comprising:
   a processing system including a processor; and
   a memory that stores executable instructions that, when executed by the processing system, facilitate performance of operations, comprising:
      transmitting to a web server an updated configuration of a media processor to enable the web server to be operable to record the updated configuration as a stored configuration to perform re-provisioning of the media processor after it experiences a loss of configuration information;
      detecting a presence of a new digital video recorder;
      responsive to the detecting the presence of the new digital video recorder:
         transmitting to the web server a request for the stored configuration;
         obtaining from the web server the stored configuration; and
         adjusting the stored configuration to match a configuration of the new digital video recorder.

18. The device of claim 17, wherein the updated configuration is transmitted to the web server responsive to monitoring performed by the web server for incremental changes to a configuration applied to the media processor that adjust operations of the new digital video recorder, and
   wherein the incremental changes generate the updated configuration for the new digital video recorder.

19. The device of claim 17, wherein the updated configuration comprises configurations of a customized electronic programming guide.

20. The device of claim 17, wherein the operations further comprise:
   detecting the loss of the configuration information;
   transmitting to the web server a request for a portion of the stored configuration;
   obtaining from the web server the portion of the stored configuration; and
   provisioning the media processor according to the portion of the stored configuration.

* * * * *